June 22, 1965 R. D. NEYER 3,190,118
INDICATOR COMPENSATION
Filed July 16, 1962 2 Sheets-Sheet 1
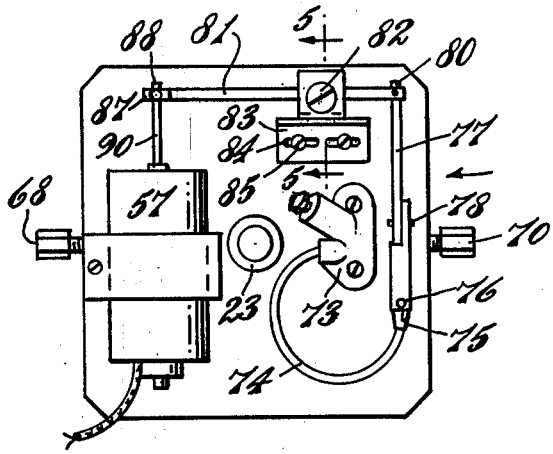
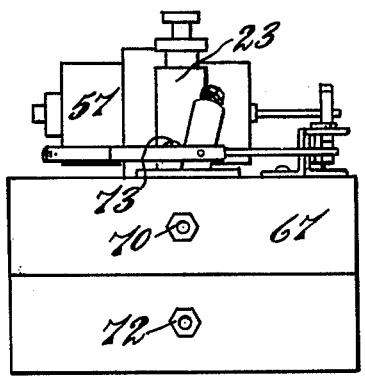
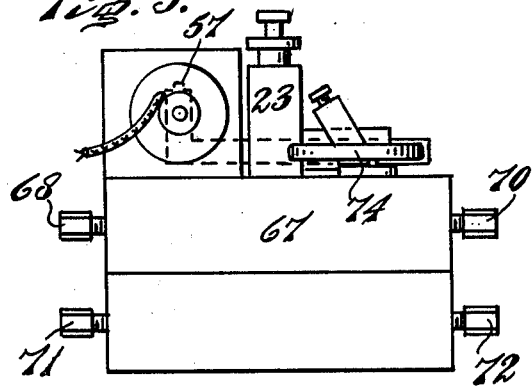
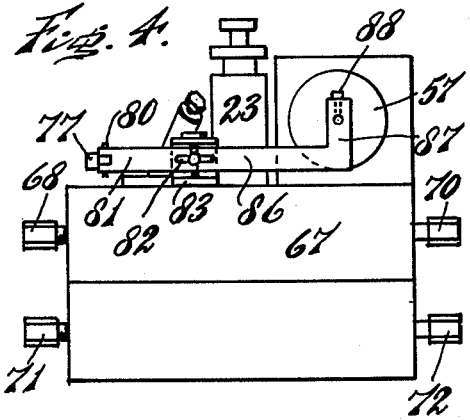
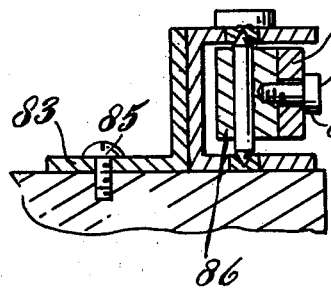
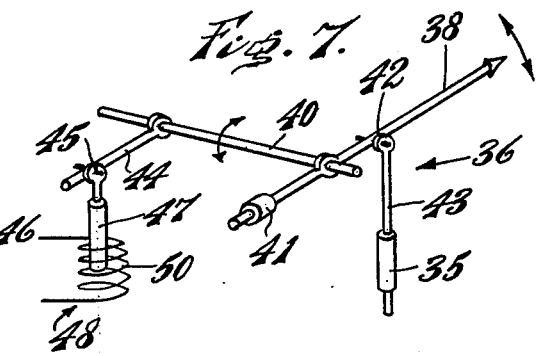
INVENTOR
Robert D. Neyer
BY
ATTORNEYS

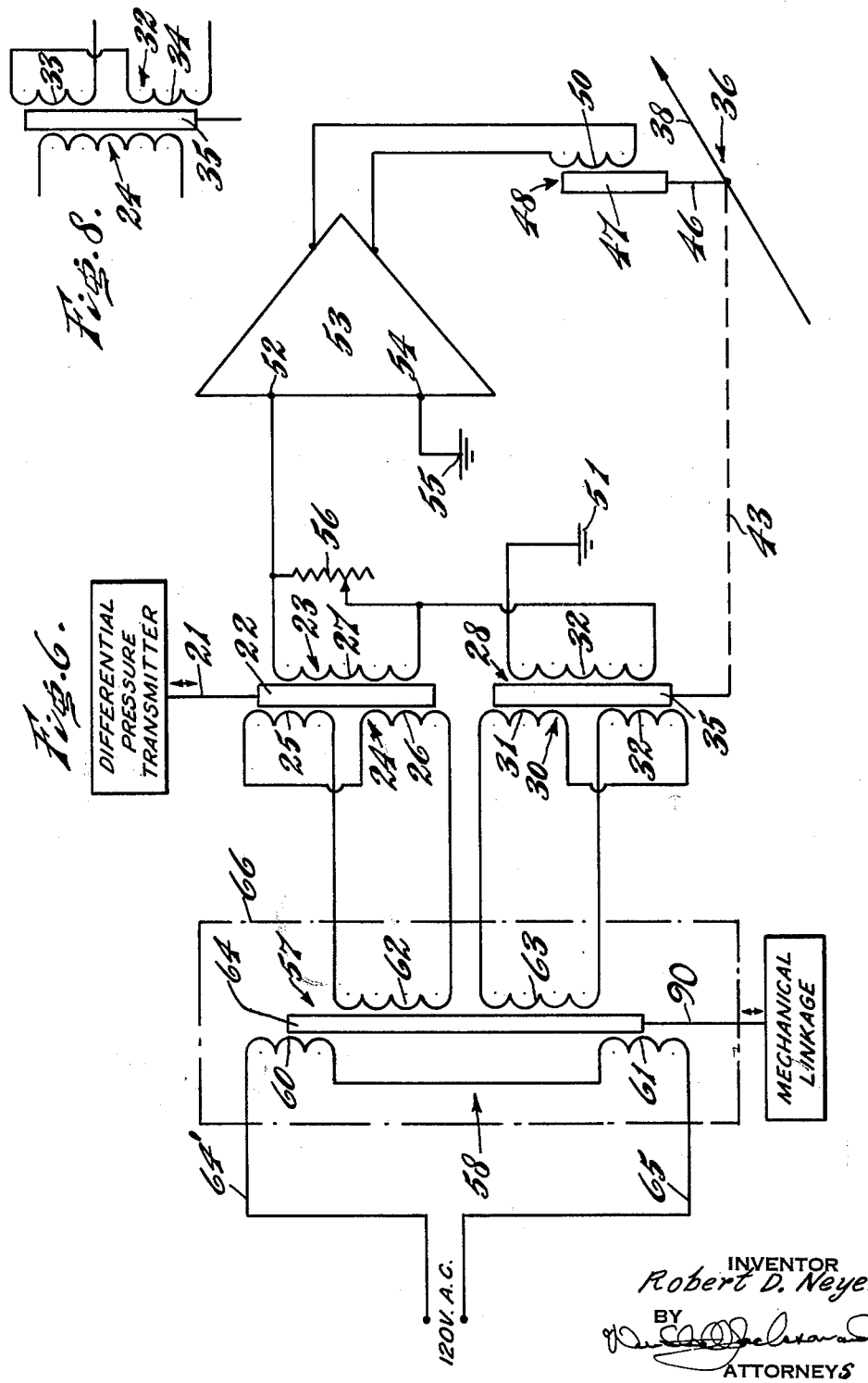

United States Patent Office

3,190,118
Patented June 22, 1965

3,190,118
INDICATOR COMPENSATION
Robert D. Neyer, Oreland, Pa., assignor to Yarnall-Waring Company, Philadelphia, Pa., a corporation of Pennsylvania
Filed July 16, 1962, Ser. No. 210,109
11 Claims. (Cl. 73—290)

The present invention relates to indicator devices and particularly to fluid level indicators. The invention is especially concerned with compensators for indicating devices and more especially directed to compensators for difference in density in response to difference in pressure of the medium whose level is being indicated.

When reference is made to indicators or indication herein, it is intended of course to include recorders and recording.

A purpose of the invention is to obtain greater sensitivity in correcting a liquid level indicator for difference in density with pressure variation than has been possible in mechanical devices which involve mechanical hysteresis.

A further purpose is to simplify the correction by applying it to an electrical indicator system, especially of the differential transformer type.

A further purpose is to more effectively correct for variation in the energizing voltage of the alternating current in indicator systems of the differential transformer type.

A further purpose is to make an essentially linear correction for difference in fluid density with pressure, but at the same time to utilize slight variations from linearity to conform to the slightly S-shaped non-linear form of the variation of the curve of steam density with pressure.

A further purpose is to obtain a continuous compensating function rather than a step-by-step compensating function on an electrical liquid level indicator of the differential transformer type.

A further purpose is to automatically compensate for variations in frequency and ambient temperature as well as variations in voltage of the source of alternating current.

A further purpose is to permit variations in the rate of corrective motion of the controlling electrical core in response to the rate of motion of the master compensator or Bourdon tube.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a top plan view of the device of the invention.

FIGURE 2 is a right side elevation of the device of FIGURE 1.

FIGURE 3 is an end elevation of the device of FIGURE 1 looking from the bottom of FIGURE 1.

FIGURE 4 is an end elevation of the device of FIGURE 1 looking from the top of FIGURE 1.

FIGURE 5 is an enlarged fragmentary section on the line 5—5 of FIGURE 1.

FIGURE 6 is an electric circuit diagram of a preferred embodiment of the device of the invention.

FIGURE 7 is a diagrammatic perspective showing the interconnection of the cores to the indicator pointer.

FIGURE 8 is a fragmentary variation of one of the differential transformers of FIGURE 6.

Describing in illustration but not in limitation and referring to the drawings:

There are at the present time in extensive use differential transformer electric liquid level gages, which respond to the movement of a differential pressure transmitter, usually a diaphragm, both sides of which are ordinarily subjected to high pressure, as in a boiler, and the two sides of which also are subject to slight differential pressure due to liquid level. The basic differential pressure liquid level gage is shown for example in Walter J. Kinderman U.S. Patent No. 2,509,644, granted May 30, 1950, for Differential Pressure Gage. The differential transformer electric circuit by which the differential pressure transmitter can control an indicator at a remote point is illustrated in James W. Williams 3d U.S. Patent No. 2,899,615, granted August 11, 1959, for Linear Movement Remote Control Servosystem.

In devices of the type under discussion, it has usually been necessary to correct for difference in density of the medium, which may be water in a steam boiler in contact with steam, or some other suitable medium, by some mechanical device. For example, correction of the indicator has been made by adjusting the linkage to the pointer. This is subject, however, to serious difficulty due to errors from mechanical hysteresis.

One of the problems of the present invention, therefore, is to obtain automatic electrical adjustment of the indicator in response to the difference in density of the medium.

In accordance with the present invention, the differential transformers are energized by an energizing transformer. The energizing transformer provides correction for variation in temperature, frequency and voltage of the alternating current source, since all of its primary windings are connected in series and its secondary windings will respond equally to each of these variables.

The energizing transformer is provided with a movable core in the present invention and by this technique the energizing transformer can vary the voltage on the secondary windings in response to its motion. When the core of the energizing transformer moves in response to the pressure to which the medium is being subjected, it preferably moves toward the center of the transformer at one end and away from the center of the transformer at the other end and desirably this movement of the ends of the core take place entirely within primary windings. The device thus in effect adjusts the voltage by adjusting the coupling between the primary and the secondary at the two ends.

The linkage which interconnects the Bourdon tube or other pressure compensator with the core of the energizing transformer is conveniently made adjustable, and thus can compensate for different slopes of the curve of pressure with respect to density. The device can thus be employed in existing differential transformer systems very simply and with a minimum of change.

Considering now the drawings in detail with particular reference to FIGURES 1 to 7, inclusive, a differential pressure transmitter 20 which may conveniently be the diaphragm of the differential pressure gage of Walter J.

Kinderman U.S. Patent No. 2,509,644 connects by any suitable rod 21 with the longitudinally movable core 22 of a transmitting differential transformer 23 which has a primary 24 preferably consisting of primary coils 25 and 26 which are wound in the same direction and oppositely connected so that they buck as shown. There is a secondary 27.

It will of course, be understood that in this and in the other transformers shown, the coils constrict with respect to the axis of the core and are disposed around the core.

The differential transformer circuit also includes a balancing differential transformer 28 which has a primary 30 desirably consisting of two coils 31 and 32 wound in the same direction but oppositely connected as shown. The transformer also has a secondary 32.

While in this particular embodiment shown in FIGURE 6 the opposed differential coils are on the side of the primary, I illustrate in FIGURE 8 that this arrangement is not necessary and if desired, both of the opposed differential coils can be placed on the side of the secondary by making the secondary 32 of two coils 33 and 34 wound in the same direction and oppositely connected as shown. This arrangement of FIGURE 8 may be applied in respect to both the transmitting differential transformer 23 and the balancing differential transformer 28, if desired.

The balancing differential transformer has a movable core 35 and is in all respects preferably identical in construction with the transmitting differential transformer.

To understand the indicator 36 is it best to consider FIGURE 7. There is there shown an indicator pointer 38 which is pivoted on a suitable shaft 40 on suitable bearings not shown and free to turn in either direction of rotation. The indicator is biased toward the zero position by a counterweight 41, although, of course, any other suitable biasing means such as spring means may be used. It will be understood that the device will fail safe by returning to zero if the electric power fails to energize it.

It will also be understood, however, that any other suitable biasing arrangement can be used to bias it in either direction as preferred in a suitable variation of the invention.

The pointer pivotally connects at 42 to a plunger 43 on which is mounted the movable core 35 of the balancing differential transformer 28. In FIGURE 6, this plunger 43 is shown schematically.

The shaft 40 also has a lever arm 44 which is pivotally connected at 45 to plunger 46 on which is mounted longitudinally movable core 47 of driving motor 48, which is preferably a solenoid motor having a coil 50. Thus when the driving motor tends to drive the pointer, the balancing core 35 follows the action.

With reference to FIGURE 6, the secondary 27 of the transmitting differential transformer 23 is connected in series with the secondary 32 of the balancing differential transformer 28 and this series loop is connected to ground at 51 at one end and to one input terminal 52 of amplifier 53, the other input terminals 54 of which is grounded at 55.

The output from the amplifier 53 is connected to the coil 50 of solenoid motor 48.

For the purpose of aligning the device, a variable resistor 56 is shunted across the secondary of transmitting differential transformer 23.

At the primary side of the differential transformer, energizing transformer 57 is provided which has a primary 58 which preferably consists of two coils 60 and 61 disposed at the ends and connected at the center. There are two secondaries 62 and 63 each arranged symmetrically with respect to an adjoining primary and preferably placed between the primaries. There is a longitudinally movable core 64.

Each of the secondaries is connected to one of the primaries of the differential transformers. The primary of the energizing transformer is connected at the opposite ends to power terminals 64' and 65 connected to a power source of alternating current suitably at 120 volts and 60 cycles.

As suggested by the dotted enclosure 66, the energizing transformer is surrounded by a magnetic shield.

It will be evident that the core is shorter than the extremities of the primary and the core 64 in moving in one direction always moves away from the center but within one primary coil and in moving in the opposite direction always moves away from the center and within the opposite primary coil, so that there is a subtracting effect of coupling at one end and an adding effect of coupling at the other end which magnifies the effect of the motion in correcting.

By reference particularly to FIGURES 1 to 5, the gage body 67 which contains the diaphragm 20 and suitable pressure connections to the top and the bottom at both sides as shown at 68, 70, 71 and 72 has a suitable pressure retaining well in which the transmitting differential transformer 23 is placed, suitable provision being made to carry out leads for connecting to the rest of the circuit.

The arrangement of the transmitting differential transformer may conform to U.S. patent application Serial No. 745,857, filed July 1, 1958, for Differential Pressure Device.

A pressure connection is taken off at 73 which communicates with and mounts a Bourdon tube pressure corrector 74 at one end. The Bourdon tube at the outer end mounts a movable head 75 which is pivotally connected at 76 to a linkage arm 77 which is adjustable in length at 78. The linkage arm 77 at its outer end pivotally connects at 80 to one end of a lever 81 which pivots at 82 intermediate its ends. The pivot 82 is made adjustable by mounting it on a bracket 83 which has elongated slots 84 in the direction of length of the lever which are supported by locking screws 85. The pivot itself at 82 includes a block 86 pivoted thereon which receives a set screw 86' which extends through an elongated longitudinal slot $86^2$ of the lever 81.

At the opposite end the lever 81 has an upward extension 87 which pivotally connects at 88 with plunger 90 which extends through and mounts at its end the core 64 of energizing transformer 57.

It will be evident that the invention may be used not only in connection with liquid level and steam systems but also in air and gas systems and in various other fluid systems where pressure may be a factor in connection with density of a liquid or any other variable which is to control a correction of the device.

In the preferred device, impedances are measured particularly between the primary of the differential transformers and the appropriately connected secondary of the energizing transformer. Thus, the impedance of the two opposed primary differential transformer windings 25 and 26 or 31 and 32, as shown in FIGURE 6, should be between one and ten times the impedance of the energizing transformer secondary winding 62 or 63 as the case may be. In a typical illustration, the energizing transformer primary has a combined impedance of the two coils of 1400 ohms and each of the energizing transformer secondary windings has an impedance of 480 ohms and the combined impedance of the primary of each of the differential transformers is 590 ohms. Similarly, in this embodiment the differential transformer secondary has an impedance of 58 ohms.

It will, of course, be understood that these values can vary, but should be kept within the range above referred to.

It will be evident that the device can have a center null balance as far as the correction of the pressure correcting device is concerned or can have a high or a low null balance as preferred. The center null balance is preferable because of the S form of the curve of water density with steam pressure as above referred to. There is a midpoint which crosses a straight line between the ends and the device is preferably adjusted so that the null is half way below the maximum and minimum pressures expected to be encountered.

The experimental results to date indicate that the correction by the device of the invention is in no case more than 4% from the theoretical desired value at any level of pressure from atmosphere to 3,000 pounds p.s.i. It will be evident that the device can be used on other mechanisms to correct for density, for example, in an electrically responsive flow meter. The device also can be used to measure differences in density.

In operation, it will be evident that any variations in temperature, frequency or voltage of the alternating current power source are corrected since the primary coils of the energizing transformer are in series and the effect is the same on both secondary coils of the energizing transformer.

As the actual pressure in the pressure vessel or other system changes, the core of the energizing transformer changes its position and varies the voltages on the secondary coils 62 and 63 in proportion to the effect of the change of pressure on the density of the liquid in the pressure vessel or other space.

The differential transformers themselves operate in a manner similar to that shown in Williams U.S. Patent No. 2,899,615 above referred to, the differential pressure transmitter moving the core of the transmitting differential transformer so that it is no longer in exact adjustment with the balancing differential transformer and a voltage is applied to the input of the amplifier which causes the solenoid motor to adjust the pointer in a manner to correct this change in voltage by adjusting the core of the balancing differential transformer. Thus the device tends to reach a self-balancing position after adjustment of the indicator pointer.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In an indicator device, a differential pressure transmitter; a transmitting differential transformer having a movable core, a primary and a secondary; a balancing differential transformer having a movable core, a primary and a secondary, the same one of the primary and secondary in both the transmitting differential transformer and in the balancing differential transformer having equal opposed coils connected in series; means operatively connecting the differential pressure transmitter to the core of the transmitting differential transformer to move that core in response to the movement of the differential pressure transmitter; an indicator having an indicator shaft pivotally mounting the indicator; means for biasing the indicator shaft in one direction; means operatively connecting the indicator shaft with the movable core of the balancing differential transformer to move the balancing direrential transformer core in response to motion of the indicator; an electric motor, means operatively connecting the electric motor to the indicator shaft and connected to the indicator shaft for moving the indicator shaft away from the initial position while the core of the balancing differential transformer moves toward balance; circuit means operatively connecting the secondaries of the transmitting differential transformer and the balancing differential transformer in series opposed to one another and to the electric motor; an energizing transformer having a primary, a core and two secondaries, means operatively connecting one of the secondaries of the energizing transformer to the primary of the transmitting differential transformer; means operatively connecting the other secondary of the energizing transformer to the primary of the balancing differential transformer, and power input terminals for applying alternating electric current to the primary of the energizing transformer.

2. An indicator device of claim 1, in which the energizing transformer has a movable core, in combination with a pressure compensator moving through space in response to overall variation in pressure adjacent the differential pressure transmitter, operatively connected to the core of the energizing transformer and adapted to vary the voltage applied to the primary of the transmitting differential transformer with respect to the voltage applied to the primary of the balancing differential transformer with variation in pressure adjacent said differential pressure transmitter.

3. An indicator device of claim 2, in which the impedance of the primary of the transmitting differential transformer and the impedance of the primary of the balancing differential transformer is in each case between one and ten times the impedance of each secondary of the energizing transformer.

4. An indicator device of claim 1, in which the impedance of the primary of the transmitting differential transformer and the impedance of the primary of the balancing differential transformer is in each case between one and ten times the impedance of each secondary of the energizing transformer.

5. In a differential alternating current electric indicator, an indicator device; a transmitter; differential transformer means including at least two differential transformers one of which is operatively connected to the transmitter and the other of which is operatively connected to the indicator device and also including motor means operatively connected to the differential transformers and to the indicator device, each of said differential transformers having a primary; an energizing transformer having a primary and two secondaries and having a movable core; circuit means connecting one of the secondaries of the energizing transformer to the primary of one of the differential transformers; circuit means connecting another of the secondaries of the energizing transformer to the primary of the other differential transformer; and means for automatically moving the position of the core of the energizing transformer in response to a correcting variable so as to change the relative voltage applied to the respective primaries of the two differential transformers.

6. A device of claim 5, in which the primary of the energizing transformer comprises opposed windings at opposed ends of the energizing transformer and extending beyond the core of the energizing transformer.

7. In an indicator device, a differential pressure transmitter having a movable element which is subjected to super atmospheric pressure on both sides and subjected to differential pressure and which moves in response to the differential pressure, a differential transformer remote control system comprising an indicator, a motor operatively connected to the indicator and two different transformers each having a primary and movable cores, one of the movable cores being operatively connected to the differential pressure transmitter and the other movable core being operatively connected to the indicator; an energizing transformer having a primary, two secondaries and a movable core, circuit means operatively connecting from one of the secondaries of the energizing transformer to the primary of one of the differential transformers; circuit means operatively connecting from the other secondary of the energizing transformer to the primary of the other differential transformer; alternating current power connections to the primary of the energizing transformer; and a pressure compensating device which moves in response to the super atmospheric pressure in the differential pressure transmitter, operatively connected to the core of the energizing transformer to move the same and vary the coupling between the primary and the respective secondaries of the energizing transformer.

8. A device of claim 7, in which the pressure compensator comprises a Bourdon tube and the operative connection to the core of the energizing transformer comprises lever means.

9. A device of claim 8, in which the lever means is adjustable to determine the rate of motion of the core of the energizing transformer in response to the movement of the Bourdon tube.

10. A device of claim 9, in which the primary of the energizing transformer comprises two coils disposed at opposite ends and each extending beyond the core of the energizing transformer.

11. A device of claim 7, in which the primary of the energizing transformer comprises two coils disposed at opposite ends and each extending beyond the core of the energizing transformer.

References Cited by the Examiner
UNITED STATES PATENTS

| | | | |
|---|---|---|---|
| 2,363,690 | 11/44 | Razek | 318—28.3 |
| 2,509,644 | 5/50 | Kinderman | 73—317 |
| 2,558,708 | 6/51 | MacGeorge | 318—28.3 |
| 2,772,383 | 11/56 | Bradley | 340—199 |
| 2,899,615 | 8/59 | Williams | 318—22 |

ISAAC LISANN, *Primary Examiner.*